United States Patent [19]

Stravitz

[11] Patent Number: 4,577,914
[45] Date of Patent: Mar. 25, 1986

[54] ASSEMBLY OF SLIDABLY INTERFITTING STORAGE UNITS

[76] Inventor: David M. Stravitz, 16 Park Ave., Suite 14 A, New York, N.Y. 10016

[21] Appl. No.: 610,699

[22] Filed: May 16, 1984

[51] Int. Cl.$^4$ ............................................. A47B 87/02
[52] U.S. Cl. ...................................... 312/10; 312/107; 312/111; 206/387
[58] Field of Search ................ 312/9, 10, 107, 108, 312/111, 119; 206/387

[56] References Cited

U.S. PATENT DOCUMENTS

| | | | |
|---|---|---|---|
| 3,159,436 | 12/1964 | Davis | 312/107 |
| 3,401,993 | 9/1968 | Fenkel | 312/111 |
| 3,666,337 | 5/1972 | Sztorc | 312/10 |
| 3,758,181 | 9/1973 | Bolyos | 312/107 |
| 3,999,818 | 12/1976 | Schankler | 312/107 |
| 4,026,615 | 5/1977 | Tazaki et al. | 206/387 |
| 4,243,279 | 1/1981 | Ackeret | 312/107 |
| 4,306,655 | 12/1981 | Smith | 206/387 |
| 4,399,913 | 8/1983 | Gelardi et al. | 312/10 |
| 4,401,216 | 8/1983 | Koch | 206/387 |
| 4,426,056 | 1/1984 | Gelardi et al. | 206/387 |

FOREIGN PATENT DOCUMENTS

| | | | |
|---|---|---|---|
| 3310889 | 10/1983 | Fed. Rep. of Germany | 312/111 |
| 1394246 | 2/1965 | France | 312/111 |

Primary Examiner—Victor N. Sakran
Attorney, Agent, or Firm—Frishauf, Holtz, Goodman & Woodward

[57] ABSTRACT

There is disclosed a storage unit for interfitting with at least one like storage unit to form an assembly of said storage units, each of said storage units comprising a top section, a rear section, a pair of side sections and a bottom section, said sections being integrally connected to form a box-shaped storage unit having a front edge defining an open front end for receiving items to be stored; a pair of projections located at opposed ends of said top section at upper corners defined between said side sections and said top section and being integrally connected to said side sections; and a pair of projection receiving means located at opposed ends of said bottom section at lower corners defined between said side sections and said bottom section, said projection receiving means being integrally formed at said lower corners, said projection receiving means each having a shape for receiving therein a projection of another like storage unit so that said projection of said another storage unit may be removably moved into said projection receiving means in interfitting engagement to connect two like storage units together to form an assembly.

6 Claims, 8 Drawing Figures

ASSEMBLY OF SLIDABLY INTERFITTING STORAGE UNITS

BACKGROUND OF THE INVENTION

The present invention is directed to storage units which are adapted to be interfitted with each other to form an assembly of such units which can be used to store records, tapes, cassettes, compact discs, computer discs and/or diskettes, books, kitchen, bath, stationery items, etc.

There is an ever increasing need to provide an inexpensive, attractive and space efficient means of storing household and business items such as, those mentioned above, and especially cassette tapes. Many families, especially those having teenagers, purchase large quantities of cassette tapes including audio cassette tapes and video cassette tapes. Businesses are also using more and more tapes and magnetic discs for the storage of information especially in conjunction with use of computers.

There is therefore a growing need for an efficient, attractive and economical means of storing cassette tapes, etc. in storage units which can be attached to compatible storage units to form an integrated assembly of such storage units to thereby maximize the number of items which can be stored in a given area, while still retaining an attractive appearance and providing a high degree of structural integrity of the assembly.

U.S. Pat. No. 3,514,170 discloses stackable and interlocking containers which employ a series of raised panels on the sides of the containers. A pair of containers are interfittingly engaged with each other when the raised panels of one container are inserted into the depressed areas formed on a corresponding surface of another container. Such containers, however, suffer from several disadvantages. First, the containers are expensive to manufacture because of the added mold and material costs associated with the raised panels. Second, the containers occupy more storage space owing to the increased dimensions of the containers resulting from the raised panels which are on the outer sides of the storage containers. Furthermore, storage containers having the raised panels are not as aesthetically appealing as storage containers having flat side surfaces.

It is therefore an object of the present invention to provide an assembly of slidably interfitting storage units having flat outer surfaces wherein the individual units can be removably interfitted with each other to provide a cost efficient and attractive means of storing various items including cassette tapes.

SUMMARY OF THE INVENTION

The present invention is directed to an assembly of slidably interfitting storage units wherein each of said units comprises a top section, a rear section, a pair of side sections and a bottom section. The various sections are integrally formed with each other and define an open front end for receiving items to be stored.

The top section of the present storage units comprises a flat rectangular surface having a pair of projections integrally extending upward from opposite ends of the top rectangular surface. The projections extend over at least a substantial portion of the length of the opposed ends of the top section.

The corners defined by the side sections and the bottom section of each storage unit comprise projection receiving means at the opposite ends of the bottom section. The projections and projection receiving means have corresponding shapes so that the projection of one storage unit may be inserted into an open end of the projection receiving means of another storage unit wherein said projection may be removably moved into said projection receiving means in interfitting engaging therewith.

As a result of the present invention, one storage unit may be engaged with another storage unit by inserting the end projection of one storage unit into the end projection receiving means of another storage unit. Since each storage unit contains both a pair of projections and a pair of projection receiving means at opposed ends thereof, each unit may be engaged with two other units to provide an interconnected assembly. Accordingly, when the storage units are interfitted in accordance with the present invention, the outer surfaces for the storage units and of the resulting assembly are substantially flat. This arrangement makes it possible to minimize the overall dimensions of each storage unit and provides a much more attractive assembly for use in both the home and in business.

DETAILED DESCRIPTION OF THE INVENTION

Figure 1:
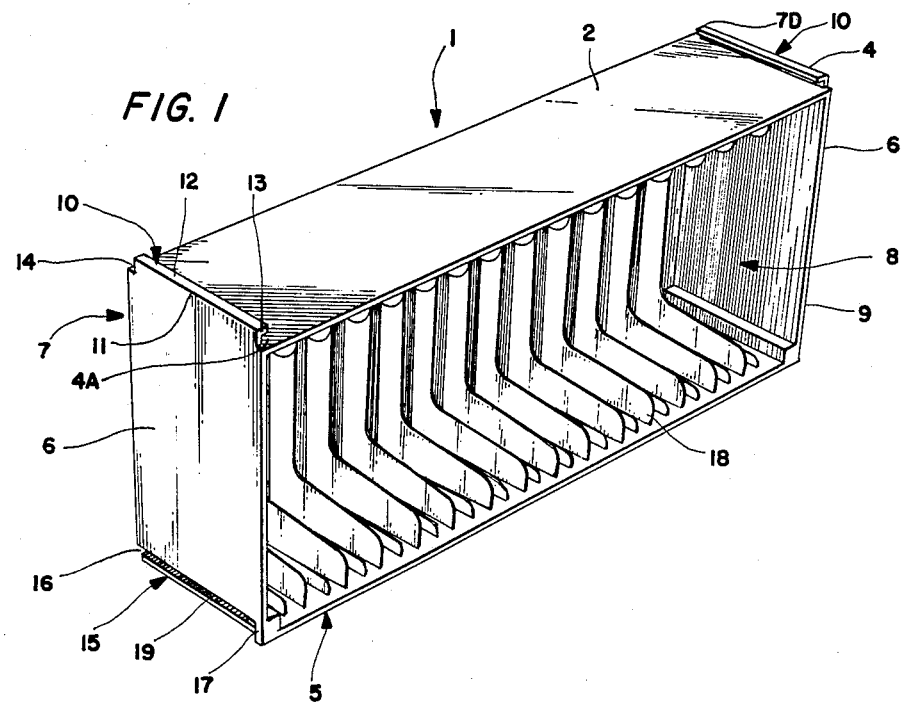
FIG. 1 is a perspective view of an embodiment of the invention suitable for the storage of cassette tapes.
Figure 2:
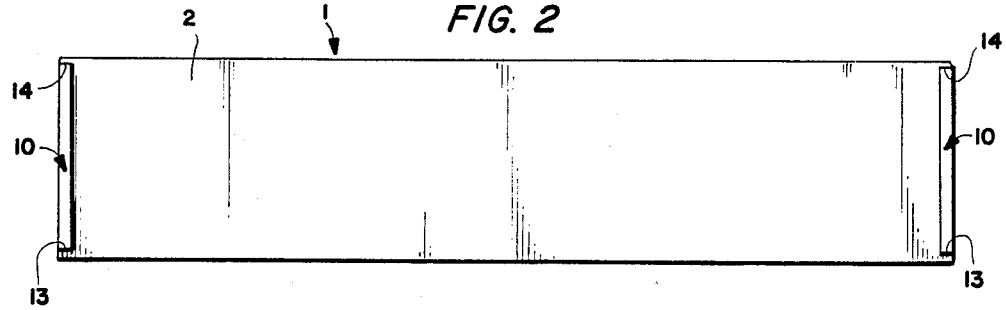
FIG. 2 is a top view of the embodiment shown in FIG. 1.

FIG. 1 shows a single molded storage unit 1 which comprises a top section 2, a bottom section 5, side sections 6 which are integrally connected to the top and bottom sections, and an integral rear section 7. The respective sections are arranged to provide an edge 9 defining an open front area 8 through which items to be stored are received.

Figure 3:
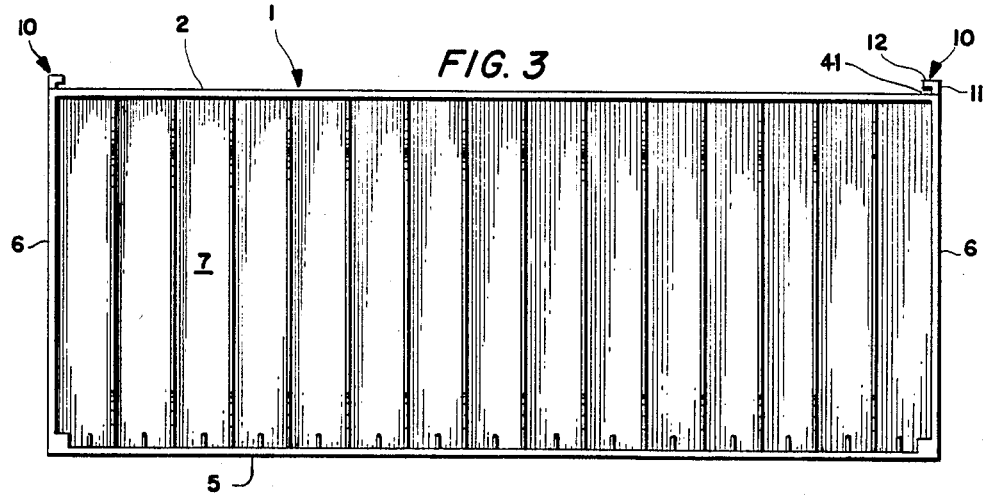
FIG. 3 is a front view of the embodiment shown in FIG. 1.

The top section 2 has a rectangular surface. Projections 10 extend upward from the rectangular top section 2 at the opposed ends 4,4A thereof. In a preferred form of the invention, as best seen in FIGS. 3 and 8 the projections 10 comprise a first elongated arm portion 11 which extends upward from the surface of the top section 2, and a second arm 12 connected to the end of the first arm 11 remote from the top section 2. In the drawings the second arm 12 is perpendicular to the first arm 11 and extends inwardly of the storage unit 1, generally in an L-shape. The projection 10 has a forward end 13 (adjacent front opening 8) and a rearward end 14 (adjacent rear section 7). The projections 10 extend over at least a substantial portion of the length of the opposed ends 4,4A of the top section 2, and preferably extend over substantially the complete length of ends 4,4A. Preferably, the forward end 13 terminates a short distance from the front edge of top section 2 as specifically shown in FIGS. 1, 2, 6, 7 and 8. Arms 12 define a space 41 between the arms 12 and the top section 2, as shown in FIG. 3.

Alternatively, the projections 10 as described above can extend outward from the side sections 6 in which case the side section 6 can be viewed as the top section 2 for purposes of positioning the other components of the storage units.

Figure 4:
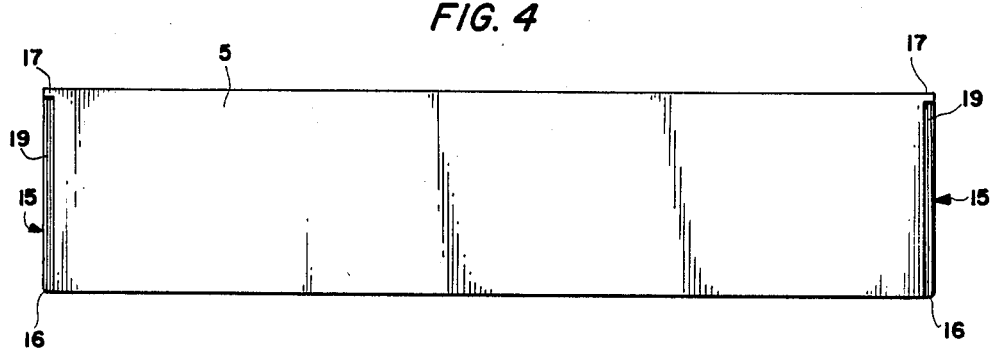
FIG. 4 is a bottom view of the embodiment shown in FIG. 1.

The lower corners at opposite ends of each storage unit 1 comprise a projection receiving means 15 which comprises an elongated channel 19 having an open end 16 (see FIGS. 1, 4 and 6) and preferably a closed end 17 shown proximal to front opening 8. The forward end 13 of projection 10 of one storage unit is inserted into open end 16 of another unit and slidably moved within the channel 19 of the projection receiving means 15 until the recessed forward end 13 contacts closed end 17 of the projection receiving means 15 at which point the respective units are in complete interfitting relationship. The closed end 17 provides a better finished appearance at the interconnection of two storage units 1, thereby improving the appearance of the assembly.

Alternatively, the positions of closed end 17 and open end 16 of the projection receiving means 15 can be reversed wherein the closed end 17 is proximal to rear section 7 and open end 16 is proximal to front opening 8. In this embodiment, rearward ends 14 (shown in FIG. 1) of projections 10 would be inserted into open end 16 and moved within the channel 19 of the projection receiving means 15 until the storage units 1 are in complete interfitting relationship as previously described.

Figure 5:
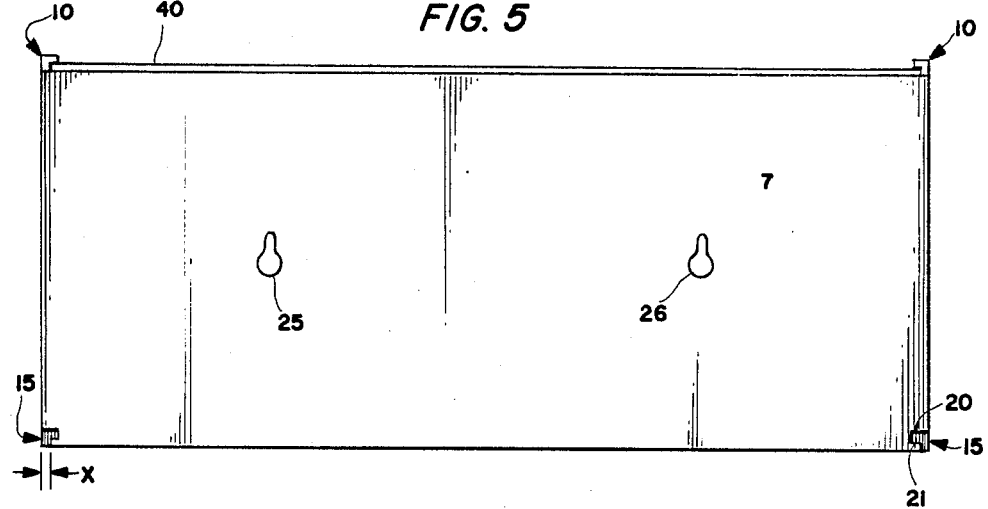
FIG. 5 is a rear view of the embodiment shown in FIG. 1.
Figure 6:
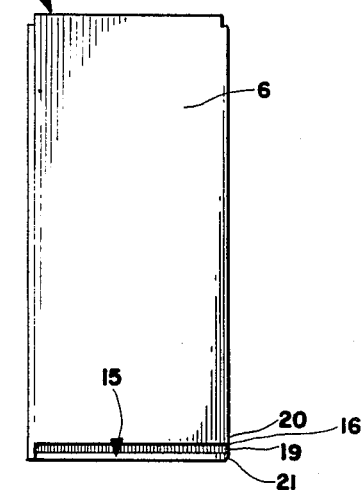
FIG. 6 is a side view of the embodiment shown in FIG. 1.

In a preferred form of the invention the projection receiving means 15 comprises a recess or channel 19 formed between a first wall 20 and a second wall 21 (see FIGS. 5, 6 and 8). The first wall 20 is part of side section 6, and the second wall 21 is part of bottom section 5. The space 41 is dimensioned to receive wall 21 therein, as best seen in FIG. 8, so that the bottom of the upper storage unit bears on the top of the lower storage unit. The recess or channel 19 has a shape to receive the second arm 12 of projection 10 whereby the projection 10 may be inserted into the open end 16 of projection receiving means 15 and slidably moved therein until the forward end 13 of projection 10 contacts the closed end 17 of projection receiving means 15. At the point of contact, the respective storage units are fully interfittingly engaged with each other to provide smooth outer surfaces, except of course, the unused projections or projection receiving means. Preferably, the recess 19 has a shape which is complimentary to the shape of second arm 12.

As shown in FIG. 5, it is preferred that the distance "x" of projection receiving means 15 equals the thickness of the first elongated arm portion 11 of projection 10 so that when projection 10 is inserted into projection receiving means 15 in complete interfitting relationship as previously described, the sides of the engaged storage units 1 are substantially smooth.

The second arm 12 of projection 10 is depicted in the drawings as a rectangular solid. However, the second arm may be rounded or otherwise shaped so long as it fits in the recess 19 as described above.

When the storage units are used to house cassette tapes, the storage unit 1 may contain spaced apart partitions 18 which form individual cassette tape holder compartments. The internal dimensions of the storage unit 1 may be tailored to house as many cassette tapes as desired. It is also possible, in accordance with the present invention, to provide storage units which have more than one row of partitions forming multiple rows of individual cassette tape compartments, or to provide a storage units with no partitions (i.e., for the storage of shoes or other large items), or other dividers suited to the article(s) to be stored.

As shown in FIG. 5, a rectangular insert 40 can be placed between projections 10 of storage unit 1 which are not in interfitting relationship with another storage unit. Insert 40 may be decorative or have a writing surface for listing the contents contained in the storage unit 1, and is preferably rectangular and substantially the same size and shape as top section 2.

The rear section 7 may contain at least one hole 25,26 opening into the storage unit for use in hanging the unit and/or to provide air circulation to prevent the build up of moisture in the storage unit which may damage cassette tapes or other items stored therein. The holes 25,26 may be keyhole shaped, as shown in FIG. 5.

Figure 7:
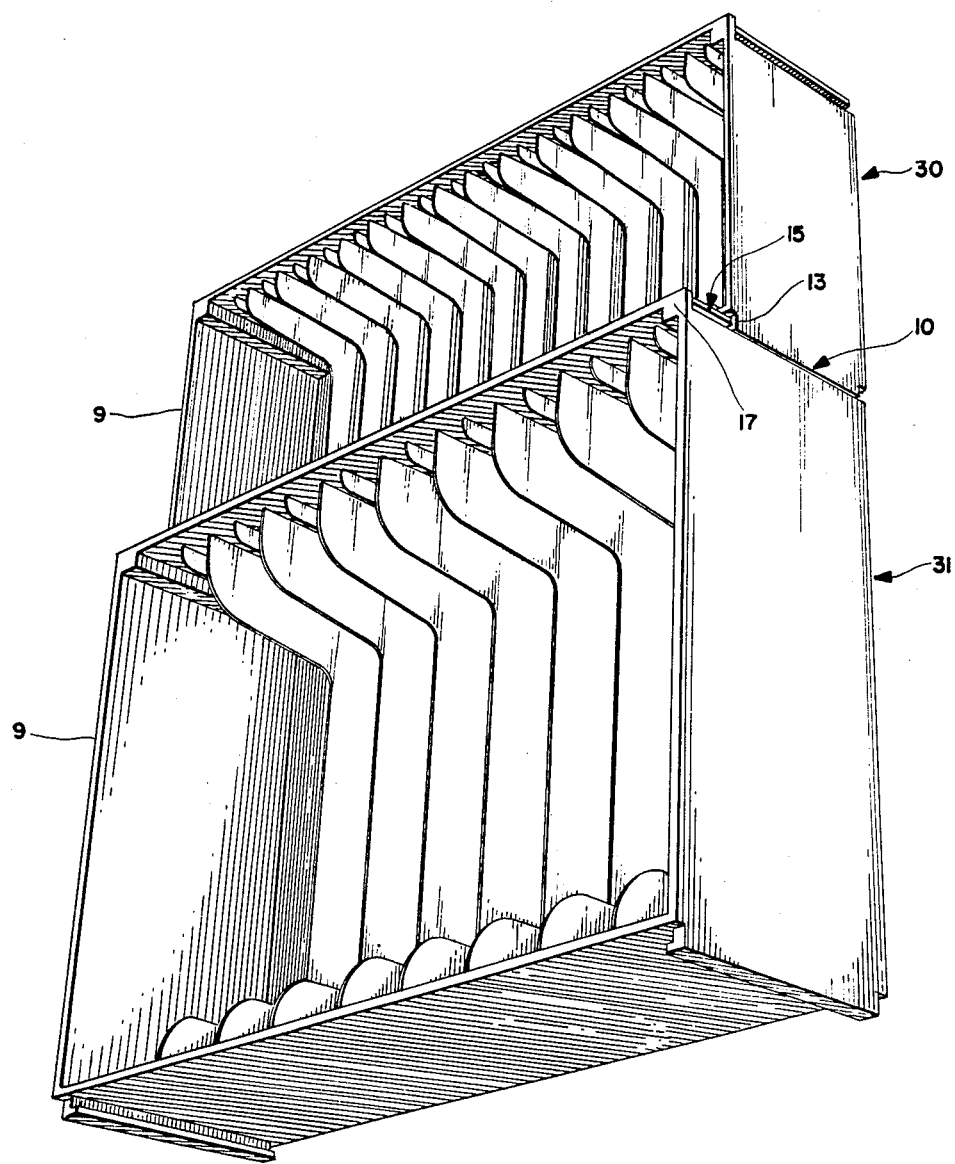
FIG. 7 is a perspective view showing two storage units in interfitting relationship.
Figure 8:
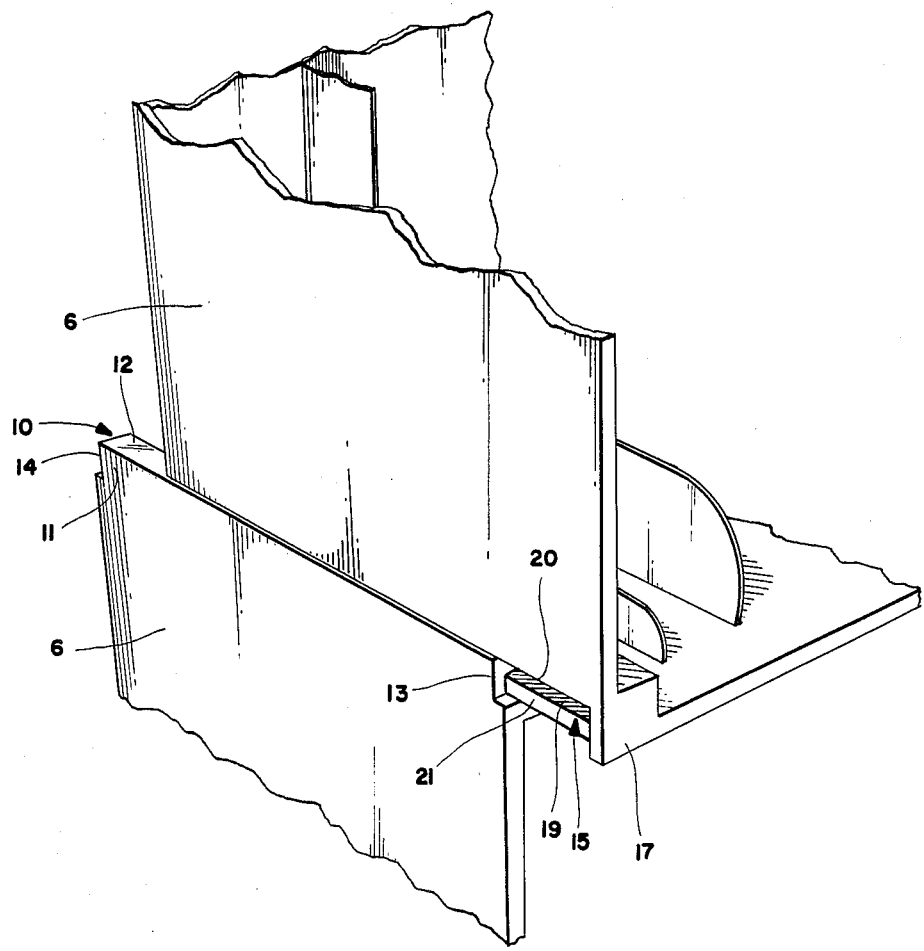
FIG. 8 is an enlarged fragmentary view of the interconnecting mechanism.

FIG. 7 shows two storage units 30,31 of different sizes wherein the projection 10 of the upper unit 30 is partially inserted in projection receiving means 15 of the lower unit 31. When the upper storage unit 30 is moved forwardly so that the forward end 13 of its projection 10 contacts the closed end 17 of projection receiving means 15 of lower unit 31, the units are in interfitting relationship with the fronts of the units flush with each other, and ready for permanent storage. As can be seen from FIG. 7, the side surfaces of the two interlocked storage units are smooth, providing an aesthetically appealing storage unit assembly. Furthermore, the front edges 9 of the units 30 and 31 provide a flat, smooth border surrounding the open front sections 8 when the projection 10 is fully forwardly inserted into projection receiving means 15. In FIG. 7, the lower unit 31 is configured to receive video tape cassettes and the upper unit 30 is configured to receive audio tape cassettes. Other combinations can be used. Preferably all units are of the same width and have mating connectors.

The storage units may be made of a suitable substantially rigid material. Plastic materials are preferred because they may be mass produced at low cost such as, for example, styrene, ABS, acrylic, or polypropylene. Styrene, however, is preferred at this time.

I claim:

1. A storage unit for interfitting with at least one like storage unit to form an assembly of said storage units, each of said storage units comprising:

a top section (2), a rear section (7), a pair of side sections (6) and a bottom section (5), said sections being integrally connected to form a box-shape storage unit having a front edge defining an open front end for receiving items to be stored, opposed ends of said side sections being integrally connected to opposed ends of said top and bottom sections, respectively to define four corners of the box shaped unit;

a pair of generally L-shaped projections (10) located at opposed ends of said top section (2) at upper corners defined by said side sections (6) and said top section (2), said L-shaped projections (10) being integrally connected to said side sections (6) and having first arms (11) extending upward therefrom above said top section (2) and extending over substantially the complete length of said opposed ends of said top section (2), each of said L-shaped projections (10) having a second arm (12) extending inwardly of said storage unit and connected substantially perpendicularly to said first arm (11) at an end of said first arm (11) remote from said top section and defining a space (41) between said top section (2) and said second arms (12); and a pair of projection receiving channels (15) located at opposed ends of said bottom section (5) at lower corners defined by said side sections (6) and said bottom section (5), said projection receiving channels (15) being integrally formed at said lower corners and recessed within the confines of said lower corners, said projection receiving channels (15) each having an L-shaped recess (19) opening from the side of the storage unit and extending in a direction toward the interior of the storage unit, for receiving therein an L-shaped projection (10) of another like storage unit, each of said projection receiving channels comprising first and second walls (21, 20; FIG. 8) defining said L-shaped recess (19), said first wall (21) being coextensive with said bottom section (5) and terminating short of said side section (6) so as to be recessed inwardly of said side sections, and said second wall (20) being substantially parallel to said bottom section (5) and extending inwardly from said side section (6) above said first wall to define a space with said first wall to receive a second arm (12) of an L-shaped projection, the thickness of said first wall (21) corresponding to the height of said space (41), said projection receiving channels (15) each having an open end (16) at the rear of said storage unit for slideably receiving said L-shaped projection (10), and a closed end (17) at the front of said storage unit for preventing further movement of said L-shaped projection (10) in said projection receiving channels (15), said closed end defining a plate-like member flush with the front of said storage unit for covering said L-shaped recess, said projection (10) having at least one end (13) which terminates a given distance from a front edge of said top section to accommodate said closed end (17), whereby a projection (10) of said another storage unit is removably slideable into said projection receiving channels in interfitting engagement to connect two like storage units together to form an assembly, said assembly having substantially flat sides even at the connection area therebetween and said top section of a storage unit is in substantial contact with a bottom section of said another storage unit.

2. The storage unit of claim 1, wherein said storage units include means for receiving a plurality of cassette tapes.

3. The storage of unit of claim 2, wherein said cassette tape receiving means comprises a plurality of substantially parallel and spaced apart partitions, pairs of adjacent partitions defining respective compartments for housing a single cassette tape.

4. The storage unit of claim 1, wherein said storage unit is made of substantially rigid plastic.

5. The storage unit of claim 1, wherein the difference between the height of the first wall and the second wall of said projection receiving means (15) is equal to the thickness of the first arm (11) of each of said projections (10).

6. The storage unit of claim 1, wherein the distance that said first wall (21) stops short of said side section (6) corresponds to the thickness of a first arm (11) of an L-shaped projection.

* * * * *